(12) United States Patent
Riviere et al.

(10) Patent No.: US 6,307,206 B1
(45) Date of Patent: Oct. 23, 2001

(54) INTEGRATED, DECONTAMINATION, TIGHT TRANSFER DEVICE USING ULTRAVIOLET RADIATION

(75) Inventors: Jean-Michel Riviere, Blois; Patrick Senges, Paris, both of (FR)

(73) Assignee: La Calhene, Velizy Cedex (FR)

( * ) Notice: Subject to any disclaimer, the term of this patent is extended or adjusted under 35 U.S.C. 154(b) by 0 days.

(21) Appl. No.: 09/292,701

(22) Filed: Apr. 15, 1999

(30) Foreign Application Priority Data

Apr. 23, 1998 (FR) .................................................. 98 05095

(51) Int. Cl.$^7$ .................................................. G01N 23/00
(52) U.S. Cl. .................................. 250/453.11; 250/504 R
(58) Field of Search ......................... 250/453.11, 454.11, 250/455.11, 504 R

(56) References Cited

U.S. PATENT DOCUMENTS 6,198,106 * 3/2001 Barney et al. ................... 250/453.11

FOREIGN PATENT DOCUMENTS

| 0 662 373 A1 | 12/1995 | (EP) . |
| 2 700 882 | 7/1994 | (FR) . |
| 2 165 155 A | 9/1996 | (GB) . |

* cited by examiner

*Primary Examiner*—Bruce C. Anderson
(74) *Attorney, Agent, or Firm*—Pearne & Gordon, LLP

(57) ABSTRACT

A tight transfer device (10) between two sterile volumes (12, 14), of the double door or port type (22, 26), is equipped with a decontamination system (44) using ultraviolet, pulsed ultraviolet or pulsed light radiation, of the facing points of the gaskets (30, 36) ensuring the necessary sealing action. This decontamination system (44) is integrated into one (20) of the flanges of the transfer device. It comprises a collar (46) made from a material able to diffuse radiation, as well as optical fibers (48), whereof one end is mounted on said collar. The other end of the optical fibers (48) is connected to a radiation source. When the source is used, the radiation, routed by fibers (48) over the entire periphery of the collar (46), diffuse into the same towards the points of the gaskets (30, 36) to be decontaminated.

8 Claims, 3 Drawing Sheets

INTEGRATED, DECONTAMINATION, TIGHT TRANSFER DEVICE USING ULTRAVIOLET RADIATION

TECHNICAL FIELD

The invention relates to a tight transfer device of the double door or port type for the provisional or permanent linking of two sterile volumes, without any risk of contaminating the latter.

A device designed in this way is used in all fields requiring the presence of a sterile atmosphere. In non-limitative manner, reference is made to the pharmaceutical and chemical industries, the medical sector, etc.

PRIOR ART

In all cases where it is wished to maintain a sterile atmosphere, it is standard practice to use a tight confinement insulator internally defining a sterile volume. A sterilizer associated with the insulator makes it possible to establish and, if appropriate, renew the sterile character of the atmosphere which it contains.

To permit the performance of a certain number of tasks within such an insulator and also for introducing into it and extracting from it products and equipments, use is conventionally made of double door or port, tight connection or transfer devices, commonly known as resin transfer ports (RTP).

A RTP device conventionally comprises two flanges connectable to one another, as well as two ports normally sealing the openings defined by the flanges. The flanges are installed on the walls of the two assemblies which it is wished to connect (insulator and rigid container insulator and flexible container, insulator and insulator, insulator and glove, etc.).

In order to ensure the connection of the two assemblies, the flanges are connected to one another and then the ports are connected to one another, whilst disconnecting them from the corresponding flanges. The removal of the thus formed double port ensures the linking of the volumes within the two assemblies.

If one of the volumes which it is wished to link is not initially sterile, it is sterilized by means of a sterilizer provided for this purpose prior to the opening of the double port.

Existing RTP devices are designed so as to ensure that none of the surfaces in contact with the non-sterile, external atmosphere, prior to the connection of the two assemblies, is in contact with the sterile, internal volume common to the two assemblies, following the opening of the double port. In practice, this result is obtained by means of two annular gaskets, which are respectively fitted to one of the flanges and to the port sealing the other flange. Each of these gaskets has, in cross-section, a V-shaped portion and the points of these two portions approximately face one another when their connection has taken place and the ports are still in place.

This conventional arrangement satisfies in general terms the sought objective. However, it has been found that bacteria can sometimes be deposited on the points of the V-shaped portions of the two gaskets and in the immediate vicinity thereof prior to the connection of the two assemblies. These points and immediately adjacent portions of the gaskets are contacted with the sterile volume common to the two assemblies following the connection and opening of the double port.

One solution to this problem has been proposed in EP-A-662 373. According to the latter document, a heating resistor is integrated into the gasket-free flange, so as to be in contact with the gaskets, in the vicinity of their points, when connection has taken place and prior to the opening of the double port. At this stage, the use of the heating element makes it possible to sterilize the possibly contaminated regions of the gaskets.

However, this known solution is not completely satisfactory. Thus, the efficiency of the decontamination obtained with the aid of such a heating element is of an arbitrary nature. Moreover, the possible obtaining of a satisfactory decontamination assumes a relatively long heating time, which is highly prejudicial to the use of the device.

DESCRIPTION OF THE INVENTION

The invention specifically relates to a tight transfer device of the RTP or some other type, whose original design makes it possible to reliably and rapidly decontaminate the facing points of gaskets and the immediately adjacent portions, following the connection of the two assemblies and prior to the opening of the double port.

According to the invention, this result is obtained by means of a tight transfer device between two sterile volumes, including two flanges connectable to one another, two ports connectable to one another and to said flanges, and two annular gaskets respectively fitted to a first of the flanges and to the port connectable to the second flange, said gaskets having in cross-section V-shaped portions, whose points face one another when the ports and flanges are connected to one another, characterized in that into the second flange are intergrated means for the decontamination, by ultraviolet, pulsed ultraviolet or pulsed light radiation, of the points of the V-shaped portions of the gaskets and immediately adjacent regions.

In a preferred embodiment of the invention, the decontamination means comprise a collar made from a material able to diffuse radiation, said collar having, in cross-section, a V-shaped portion contactable with the V-shaped portions of the gaskets, and optical fibres, whose first ends are regularly distributed around said collar and turned towards the point of the V-shaped portion thereof.

The two ends of the optical fibres are then connected to a radiation source.

Preferably, outside the collar, the optical fibres are grouped into at least one cable. Thus, according to a preferred, but in no way limitative arrangement, the optical fibres are grouped into two cables penetrating the second flange at diametrically opposite locations.

In order to facilitate installation, the second flange advantageously comprises two parts connected to one another by assembly means and between which is installed the aforementioned collar. The cable then travels in a passage formed in a first of the two parts, which is turned towards the outside of the corresponding sterile volume, sealing means being provided between the two parts, opposite to the collar with respect to said passage.

In the preferred embodiment of the invention, the first ends of the optical fibres are housed in blind holes formed in the collar, said holes being located in regularly spaced planes passing through the axis of the collar and on a truncated cone-shaped surface, bisecting the V-shaped portion of the collar.

The first ends of the optical fibres are separated from one another by a distance such that the point of the V-shaped portion of the collar is swept over its entire circumference by the radiation.

BRIEF DESCRIPTION OF THE DRAWINGS

The invention is described in greater detail hereinafter relative to a non-limitative embodiment and with reference to the attached drawings, wherein show.

DETAILED DESCRIPTION OF A PREFERRED EMBODIMENT OF THE INVENTION

Figure 1:
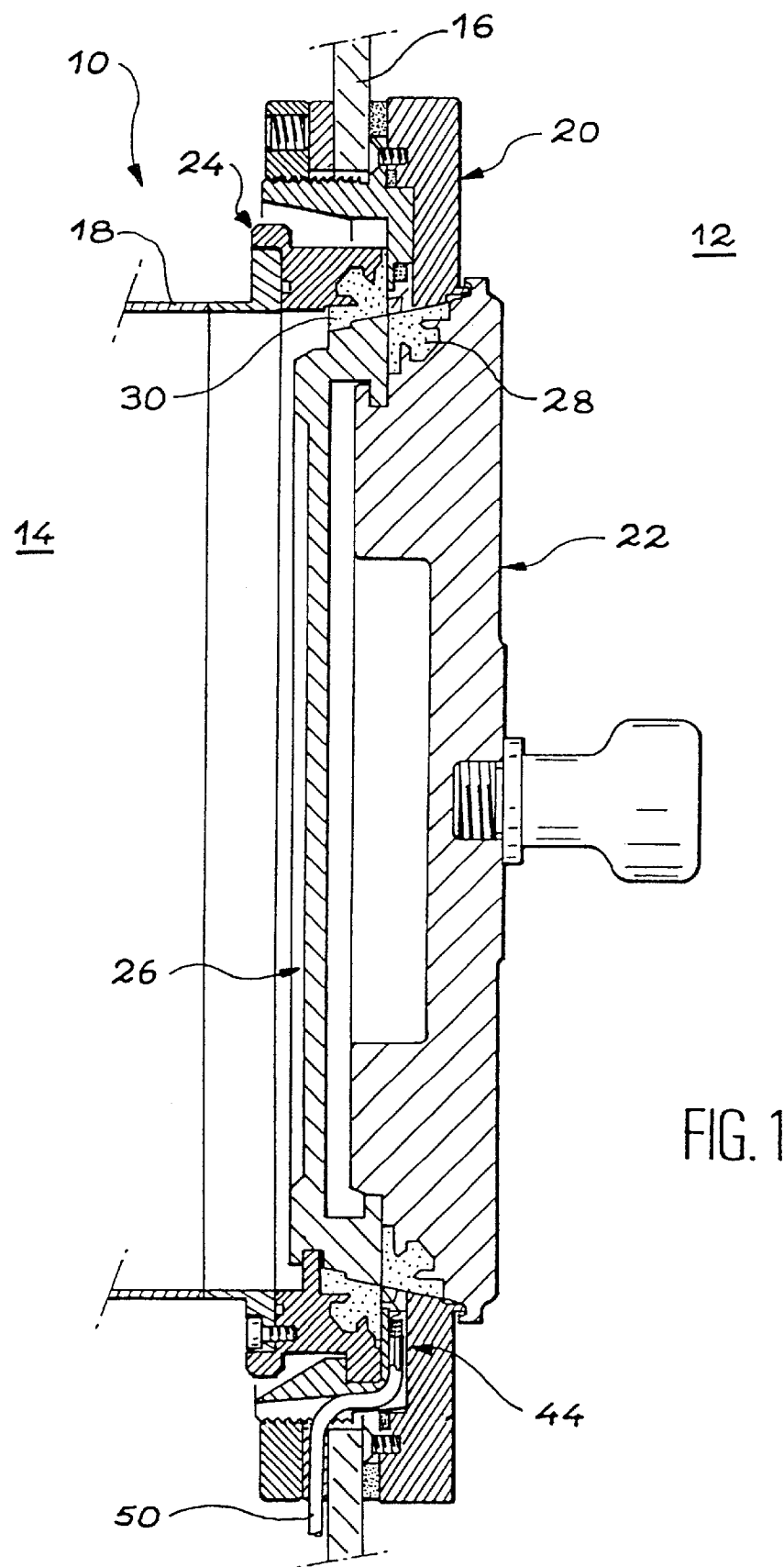
FIG. 1 A side view, in cross-section, of a tight transfer device according to the invention, in its connected state and prior to the opening of the double port.

In the drawings, reference numeral 10 designates in general manner a tight transfer device according to the invention. This device, of the RTP type, makes it possible to link two sterile volumes 12 and 14, whilst avoiding any risk of their contamination through the external atmosphere.

In the embodiments shown, the sterile volume 12 is the internal volume of an insulator, whereof a small portion of the wall is illustrated at 16. The sterile volume 14 is the internal volume of a rigid wall container, whereof a small wall portion is illustrated at 18.

However, this embodiment must not be considered as having a limitative nature. Thus, the sterile volume 14 can also be defined within a flexible wall container, within another insulator, within a handling glove, or within any other detachable or removable assembly connectable to the enclosure defining the sterile volume 12, without passing outside the scope of the invention.

In known manner, the tight transfer device 10 comprises a first flange 20 fixed to the wall 16, as well as a first door or port 22 normally sealing a circular opening defined by the flange 20.

The tight transfer device 10 also comprises a second flange 24, fixed to the partition 18, as well as a second door or port 26 normally tightly sealing a circular opening defined by the flange 24.

The first port 22 cooperates with the first flange 20 by a mechanism, e.g. of the bayonet type, which prevents any untimely opening of the port 22 in the absence of a deliberate manipulation thereof.

In comparable manner, the second port 26 cooperates with the second flange 24 by means of a mechanism, e.g. of the bayonet type, which prevents the untimely opening of the port 26 in the absence of a deliberate manipulation thereof.

In accordance with known features, the flanges 20 and 24 are able to cooperate with one another by means of a mechanism, e.g. of the bayonet type, by means of which the two flanges can be connected and disconnected at random.

In comparable manner, a mechanism, e.g. of the bayonet type, is also provided between the two ports 22 and 26, so that the latter can be automatically connected to one another when disconnected from their respective flanges 20 and 24, and vice versa.

These different mechanisms are well known and can assume different forms without passing beyond the scope of the invention. They do not form part of the invention and no detailed description thereof will be provided. Still in known manner, security systems are generally integrated in the tight transfer device 10, in order to avoid incorrect manipulations which may lead to a linking of the sterile volumes 12 and 14 with the external atmosphere. These security systems do not form part of the invention and will consequently not be described in detail here In conventional manner, the linking of the sterile volumes 12 and 14 is ensured by firstly connecting the flanges 20 and 24 to one another with the aid of the mechanism provided for this purpose. Then, the ports or doors 22 and 26 are connected to one another, whilst being disconnected from their respective flanges 20 and 24, the opening of the thus formed double port ensuring the linking of the volumes 12 and 14.

Still in accordance with the known procedure, the tight transfer device 10 illustrated in FIG. 1 also comprises two annular gaskets 28 and 30, arranged so as to maintain the confinement of the sterile volumes 12 and 14 at all stages of use of the device. These annular gaskets 28 and 30 are designed so as to ensure that the surfaces in contact with the external atmosphere, when the flanges 20 and 24 are not coupled, do not contaminate the sterile volumes 12 and 14 during the subsequent linking thereof.

Figure 2:
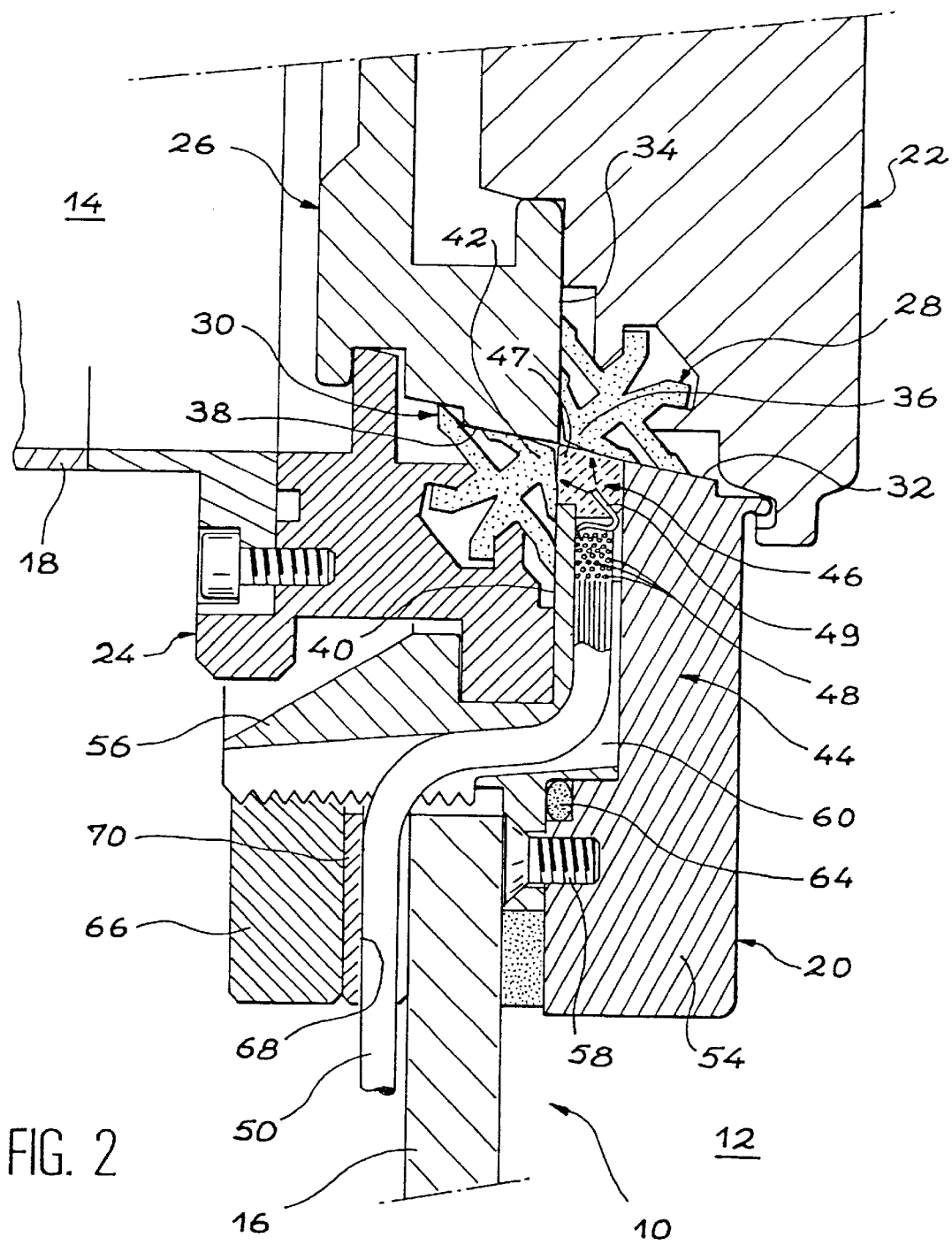
FIG. 2 A sectional view comparable to FIG. 1, illustrating on a larger scale the location of the decontamination means.

As is illustrated in greater detail by FIG. 2, the annular gasket 28 is fitted to the port 22 and the annular gasket 30 is fitted to the flange 24.

More specifically, the annular gasket 28 is fitted to the port 22, so as to be able to tightly bear both on the inner, peripheral surface 32 of the flange 20, when the port 22 is connected to said flange, and to the outer face 34 of the port 26, when the ports 22 and 26 are connected to one another. To this end, the annular gasket 28 has a V-shaped portion 36, which is housed in the angle formed between the surface 32 and the face 34, when the port 22 is connected both to the flange 20 and to the port 26.

In a comparable manner, the annular gasket 30 is fitted to the flange 24 so as to be able to tightly bear both against the outer, peripheral surface 38 of the port 26, when the latter is connected to the flange 24, and to the outer face 40 of the flange 20, when the flanges 20 and 24 are connected to one another. To this end, the annular gasket 30 has a V-shaped portion 42, which is housed in the angle formed between the surface 38 and the face 40, when the flange 24 is connected both to the port 26 and to the flange 20.

Figure 3:
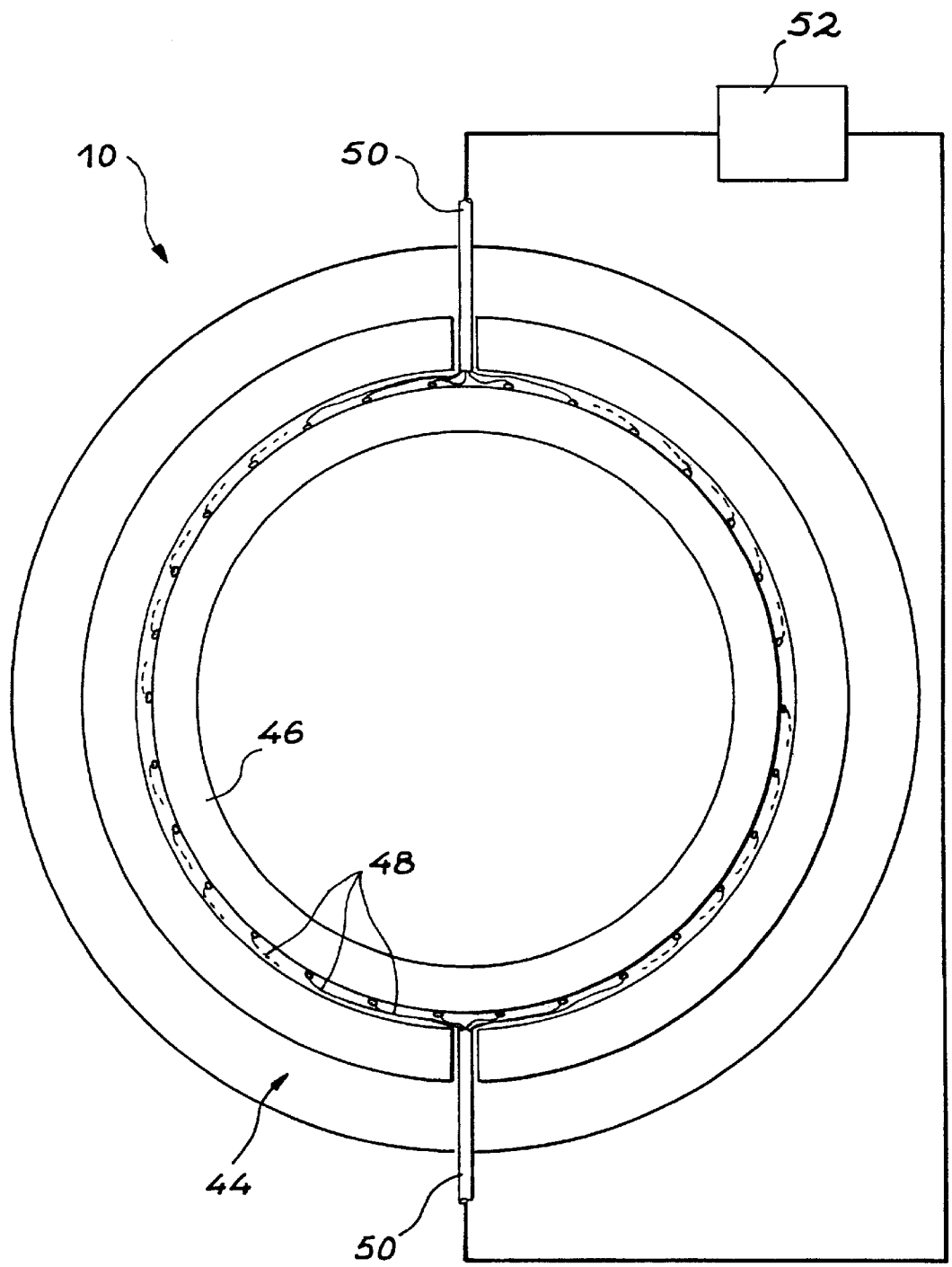
FIG. 3 A front view, diagrammatically illustrating the location of the optical fibres in the device according to the invention.

Consequently, according to a known arrangement, the points of the V-shaped portions 36 and 42 of the gaskets 28 and 30 face one another when the tight transfer device is in the state illustrated in FIGS. 1 to 3, i.e. when the flanges 20 and 24 and the ports 22 and 26 are connected to one another. The device is in this state when the two assemblies have been connected by their flanges 20 and 24, but the sterile volumes 12 and 14 have not yet been linked with one another.

According to the invention, the tight transfer device 10 is equipped with means 44 of the decontamination, by ultraviolet, pulsed ultraviolet or pulsed light radiation, of points of the V-shaped portions 36 and 42 of the gaskets 28 and 38 and the regions immediately adjacent to said points. These decontamination means 44 are integrated into the flange 20.

A preferred embodiment of the decontamination means 44 using radiation, in particular ultraviolet radiation, will now be described in detail with particular reference to FIGS. 2 and 3.

These decontamination means 44 comprise a collar 46 made from a material able to diffuse radiation. This material can in particular be polymethyl methacrylate (PMMA), quartz or any other suitable material.

The collar 46 is integrated into the flange 20, where it is positioned in the angle formed between the surface 32 and the face 40. More specifically, in cross-section, the collar 46 has a V-shaped portion 47, on which are formed the adjoining end portions of the surface 32 and the face 40. This V-shaped portion 47 of the collar 46 consequently comes into contact with the V-shaped portion 36 of the gasket 28 and with the V-shaped portion 42 of the gasket 30, when the port 22 and flange 24 are connected to the flange 20, as illustrated by FIGS. 1 and 2.

The decontamination means 44 also incorporate optical fibres 48, whose first ends are fitted to the collar 46, as shown in FIGS. 2 and 3. The nature of the optical fibres 48 is chosen so as to permit an effective radiation transmission. Advantageously, for this purpose use is made of polymethyl methacrylate (PMMA) optical fibres.

The first ends of the optical fibres 48 are received and bonded in blind holes 49 formed in the collar 46, so that these ends are turned towards the point of the V-shaped portion 47 of said collar and are spaced therefrom by a given distance.

More specifically, the blind holes 49 in which are received the first ends of the optical fibres 48 are located in regularly spaced planes passing through the axis of the collar 46, as well as on a truncated cone-shaped surface bisecting the angle formed by the V-shaped portion 47 of said collar. Thus the first ends of the optical fibres 48 are regularly distributed, in accordance with a constant spacing, over the entire circumference of the collar 46.

Outside the collar 46, the optical fibres 48 are grouped so as to form at least one cable 50, which is extended outside the flange 20 and outside the insulator defining the sterile volume 12. In the preferred embodiment of the invention illustrated in FIG. 3, the optical fibres 48 are combined into two cables 50, which penetrate the flange 20 at two diametrically opposing locations thereof.

The opposite ends of the optical fibres 48 are connected to a source 52 of radiation, particularly ultraviolet radiation. This source is chosen so as to permit in as rapid a manner as possible (e.g. approximately 3 min), the decontamination of the points of the V-shaped portions 36 and 42 of the gaskets 28 and 30. It can either be a continuous source or a pulsed source.

When the ultraviolet radiation source 52 is used, the ultraviolet rays pass continuously through each of the optical fibres 48 up to the collar 46. The ultraviolet radiation routed by each of the fibres 48 to the collar 46 is diffused in the V-shaped portion 47 thereof, beyond the end of each fibre, in accordance with a diffusion cone diagrammatically illustrated in FIG. 3. In an in no way limitative manner, the aperture angle of said diffusion cone can be approximately 60°.

The distance separating the end of each of the optical fibres 48 from the point of the V-shaped portion 47 of the collar 46 is determined, as a function of the characteristics of the ultraviolet radiation source 52, so that the power of the radiation reaching the points of the V-shaped portions 36 and 42 of the gaskets 28 and 30 is adequate to guarantee the efficiency of the decontamination.

The distance separating from one another the ends of each of the fibres 48 fitted in the collar 46 is then determined in such a way that the points of the V-shaped portions 36 and 46 of the gaskets 28 and 30 are swept over their entire circumference by the ultraviolet radiation, when the source 52 is used.

This determination is made as a function of the aperture angle of the diffusion cone of the radiation in the collar 46 and as a function of the distance between the ends of the fibres 48 and the point of the V-shaped portion 47 of the collar.

When all these conditions are respected, an effective decontamination of the points of the V-shaped portions 36 and 42 of the gaskets 28 and 30 can be rapidly obtained, e.g. in approximately 3 min. This decontamination is carried out when the tight transfer device 10 is in the state illustrated in FIGS. 1 and 2, i.e. when the flanges 20 and 24 are connected to one another and when the ports 22 and 26 are still connected to said flanges.

It should be noted that a not shown security system can be added to the device, so as to ensure that the double port or door formed by the ports or doors 22 and 26 cannot be opened prior to the carrying out of the decontamination of the points of the V-shaped portions 36 and 42 of the gaskets using the decontamination means 44.

As is more particularly illustrated in FIG. 2, the integration of the decontamination means 44 in the flange 20, during the installation thereof, can be facilitated by giving it a particular structure which will now be described.

According to the recommended arrangement, the flange 20 comprises a first part 54 on which is formed the portion of the internal, peripheral surface 32 which does not belong to the collar 46. The collar 46 can be bonded to said first part 54, in order to complete the internal, peripheral surface 32.

The flange 20 also has a second part 56, which is flush mounted and centred in a recess of part 54. The part 54 comprises the portion of the external face 40 not formed on the collar 46. It is fixed to the part 54 by assembly means, such as screws, one of which is illustrated at 58 in FIG. 3. When the part 56 is fixed to the part 54 by screws 58, the collar 46 is locked between the two parts and the external face 49 is complete.

As shown in FIG. 2, the part 56 has passages 60 through which travels each of the cables 50. The passages 60 issue into an annular recess surrounding the collar 46 and in which travel the portions of the optical fibres 48 located between the cables 50 and the blind holes 49 machined in the collar 46. At their opposite end, the passages 60 issue to the outside of the insulator.

An O-ring 64 is interposed between the parts 64 and 66, in their portions positioned radially towards the outside with respect to the passages 60, i.e. opposite the collar 46 with respect thereto. This avoids any risk of a loss of sealing of the sterile volume 12.

Part 56 of flange 20 also has conventional means enabling the tight fitting of said flange to the insulator wall 16. These means essentially consist of a nut 66 screwed onto a threaded, outer portion of part 56. To prevent the crushing thereof, the cables 50 pass through passages 68 machined in a washer 70, interposed between the nut 66 and the wall 16.

The larger the diameter of the tight transfer device the larger the number of optical fibres 48 of the decontamination means 44.

It is readily apparent that the invention is applicable no matter what the shape or form given to the annular gaskets 28 and 30 equipping the device. From this standpoint, the shape of said gaskets illustrated in FIG. 2 must in no way be considered as limitative.

What is claimed is:

1. Tight transfer device between two sterile volumes, including two flanges connectable to one another, two ports connectable to one another and to said flanges, and two annular gaskets respectively fitted to a first of the flanges and to the port connectable to the second flange, said gaskets having in cross-section V-shaped portions, whose points face one another when the ports and flanges are connected to one another, wherein into the second flange are integrated means for the decontamination, by ultraviolet, pulsed ultraviolet or pulsed light radiation, of the points of the V-shaped portions of the gaskets and immediately adjacent regions.

2. Device according to claim 1, wherein the decontamination means comprise a collar made from a material able to diffuse radiation, said collar having, in cross-section, a V-shaped portion, which can be in contact with the V-shaped portions of gaskets, and optical fibres, whereof first ends are regularly distributed around said collar and turned towards the point of the V-shaped portion thereof.

3. Device according to claim 2, wherein the second ends of the optical fibres are connected to a radiation source.

4. Device according to claim 2, wherein, outside the collar, the optical fibres are combined into at least one cable.

5. Device according to claim 4, wherein the optical fibres are combined into two cables, which penetrate the second flange at diametrically opposite locations.

6. Device according to claim 4, wherein the second flange comprises two parts connected to one another by assembly means and between which is installed said collar, the cable travelling in a passage formed in a first of said parts, turned towards the outside of the corresponding sterile volume, sealing means being provided between said parts, opposite the collar with respect to said passage.

7. Device according to claim 2, wherein the first ends of the optical fibres are housed in blind holes formed in the collar, said holes being located in regularly spaced planes passing through the axis of the collar and on a truncated cone-shaped surface, bisecting the V-shaped portion of the collar.

8. Device according to claim 2, wherein the first ends of the optical fibres are separated from one another by a distance such that the point of the V-shaped portion of the collar can be swept by the radiation over the entire circumference thereof.

* * * * *